US010380586B2

(12) United States Patent
Haulotte et al.

(10) Patent No.: US 10,380,586 B2
(45) Date of Patent: Aug. 13, 2019

(54) SYSTEMS AND METHODS FOR MANAGING FUNDS FOR FINANCIAL TRANSACTIONS

(71) Applicant: MasterCard International Incorporated, Purchase, NY (US)

(72) Inventors: Vincent Alain Rene Haulotte, Manchester, MO (US); Ganesh L. Iyer, Chesterfield, MO (US); Srinivasarao Nidamanuri, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 899 days.

(21) Appl. No.: 14/924,220

(22) Filed: Oct. 27, 2015

(65) Prior Publication Data

US 2017/0116606 A1    Apr. 27, 2017

(51) Int. Cl.
*G06Q 20/40* (2012.01)
*G06Q 20/36* (2012.01)
*G06Q 20/22* (2012.01)

(52) U.S. Cl.
CPC .......... *G06Q 20/40* (2013.01); *G06Q 20/227* (2013.01); *G06Q 20/367* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| | | | |
|---|---|---|---|
| 6,439,455 B1 | 8/2002 | Everett et al. | |
| 7,206,769 B2 | 4/2007 | Laurent et al. | |
| 7,233,926 B2 | 6/2007 | Durand et al. | |
| 7,398,236 B2 | 7/2008 | Jaffe | |
| 7,555,451 B2 | 6/2009 | Rugge et al. | |
| 7,707,105 B2 | 4/2010 | O'Neil | |
| 7,725,387 B1 * | 5/2010 | Fitch | G06Q 40/025 705/38 |
| 7,930,243 B1 * | 4/2011 | Fitch | G06Q 40/025 705/38 |
| 8,027,891 B2 | 9/2011 | Preston et al. | |
| 8,190,502 B2 | 5/2012 | Moran et al. | |
| 8,260,699 B2 | 9/2012 | Smith et al. | |
| 8,285,622 B1 | 10/2012 | Rao et al. | |

(Continued)

OTHER PUBLICATIONS

"OnBudget Prepaid MasterCard," OnBudget, Inc., available at https://onbudget.com, last visited Oct. 27, 2015.

*Primary Examiner* — Frantzy Poinvil

(57) ABSTRACT

Embodiments of the disclosure enable a user to manage funds for financial transactions. In some embodiments, a request for authorization of a financial transaction associated with one or more factors including a transaction amount is received from a financial transaction processing computing device, a first purse associated with a cardholder account that is associated with one or more purses is identified based on the one or more first factors, a plurality of parameters associated with the first purse including a first purse priority and a first purse balance are identified, the first purse balance is compared with the transaction amount to determine a difference between the first purse balance and the transaction amount, and it is determined whether to approve the request for authorization based on the first purse priority and the difference between the first purse balance and the transaction amount.

20 Claims, 7 Drawing Sheets

(56) References Cited

U.S. PATENT DOCUMENTS

| | | | |
|---|---|---|---|
| 8,296,206 B1 | 10/2012 | Del Favero et al. | |
| 8,788,414 B2 * | 7/2014 | Sorbe | G06Q 20/10 |
| | | | 705/39 |
| 9,524,500 B2 * | 12/2016 | Dave | G06Q 20/20 |
| 2007/0185820 A1 * | 8/2007 | Talker | G06Q 20/04 |
| | | | 705/67 |
| 2007/0266130 A1 * | 11/2007 | Mazur | G06Q 20/12 |
| | | | 709/223 |
| 2008/0249941 A1 * | 10/2008 | Cooper | G06Q 20/10 |
| | | | 705/44 |
| 2008/0270246 A1 * | 10/2008 | Chen | G06O 20/105 |
| | | | 705/17 |
| 2009/0030819 A1 | 1/2009 | VanLeeuwen | |
| 2009/0204531 A1 | 8/2009 | Johnson | |
| 2011/0320294 A1 | 12/2011 | Votaw et al. | |
| 2012/0150736 A1 | 6/2012 | Dickerson et al. | |
| 2012/0278235 A1 | 11/2012 | Kitchel | |
| 2012/0330841 A1 * | 12/2012 | Chen | G06O 20/102 |
| | | | 705/44 |
| 2014/0058938 A1 * | 2/2014 | McClung, III | G06Q 20/227 |
| | | | 705/41 |
| 2014/0136349 A1 * | 5/2014 | Dave | G06Q 20/20 |
| | | | 705/16 |
| 2014/0279474 A1 | 9/2014 | Evans et al. | |
| 2014/0324690 A1 | 10/2014 | Allen et al. | |
| 2014/0372300 A1 | 12/2014 | Blythe | |
| 2015/0019422 A1 * | 1/2015 | Low | G06Q 20/10 |
| | | | 705/41 |
| 2016/0275475 A1 * | 9/2016 | Lin | G06Q 20/32 |

\* cited by examiner

SYSTEMS AND METHODS FOR MANAGING FUNDS FOR FINANCIAL TRANSACTIONS

FIELD OF THE DISCLOSURE

The subject matter described herein relates generally to electronic commerce and, more specifically, to managing funds for one or more financial transactions.

BACKGROUND

Payment cards allow a cardholder to conduct financial transactions and, for various reasons, are increasingly being used to purchase goods and/or services. Payment cards are typically associated with one or more mechanisms that control at least some access to funds (e.g., a bank account, a line of credit). For example, some payment cards allow a cardholder to withdraw funds up to a predetermined threshold (e.g., a bank balance, a credit limit). However, the mechanisms typically provide either full access (e.g., the payment card is activated) or no access to the funds (e.g., the payment card is at the predetermined threshold, suspended, or canceled).

SUMMARY

Embodiments of the disclosure enable a cardholder to manage funds for financial transactions in accordance with a budget. In one aspect, a method is provided for managing funds for one or more financial transactions. The method includes receiving, from a financial transaction processing computing device, a request for authorization of a financial transaction that is associated with one or more factors including a transaction amount; identifying a purse associated with a cardholder account that is associated with one or more purses based on the one or more factors; identifying a plurality of parameters associated with the purse, the plurality of parameters including a purse priority and a purse balance; comparing the purse balance with the transaction amount to determine a difference between the purse balance and the transaction amount; and determining whether to approve the request for authorization based on the purse priority and the difference between the purse balance and the transaction amount.

In another aspect, a computing device is provided for managing funds for one or more financial transactions. The computing device includes a memory storing data associated with one or more cardholder accounts that are associated with one or more purses and computer-executable instructions, and a processor configured to execute the computer-executable instructions to identify a purse associated with a cardholder account of the one or more cardholder accounts stored in the memory, identify a purse priority and a purse balance associated with the purse, determine a difference between the purse balance and a transaction amount associated with a request for authorization, and determine whether to approve the request for authorization based on the purse priority and the difference between the purse balance and the transaction amount.

In yet another aspect, a computer-readable storage device having computer-executable instructions embodied thereon is provided. Upon execution by at least one processor, the computer-executable instructions cause the processor to identify a purse associated with a cardholder account and a purse priority and a purse balance associated with the purse, determine a difference between the purse balance and a transaction amount associated with a request for authorization, and determine whether to approve the request for authorization based on the purse priority and the difference between the purse balance and the transaction amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
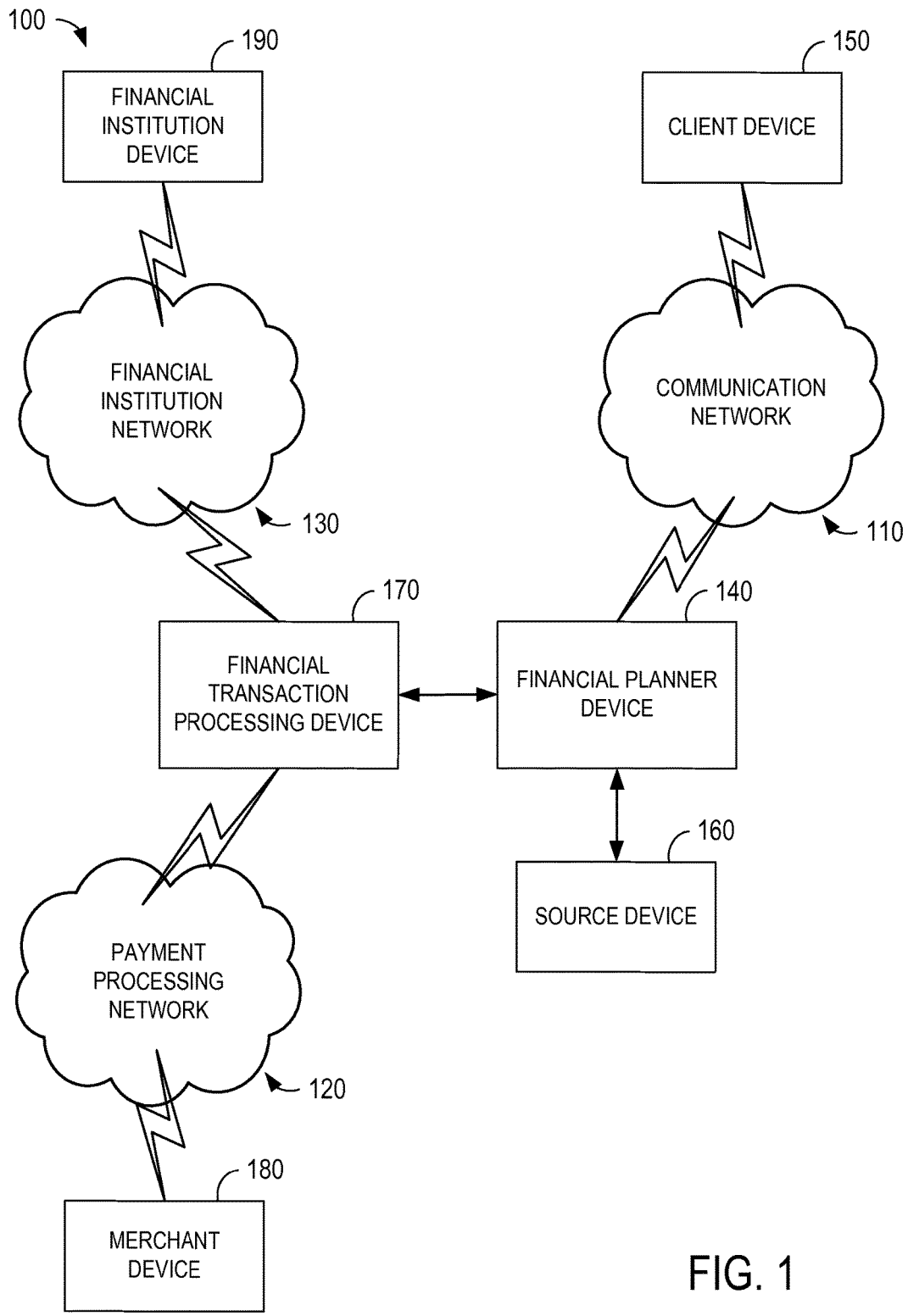
FIG. 1 is a block diagram illustrating an example environment for managing funds for one or more financial transactions.

The subject matter described herein relates to managing funds for one or more financial transactions in accordance with a budget. Embodiments of the disclosure provide a user (e.g., a cardholder) with technical budgeting support to set and manage a budget. For example, an unbanked user (e.g., a user without a savings account or a checking account) may utilize the embodiments of the disclosure to efficiently and effectively deposit funds into, and withdraw funds from (e.g., spend), a cardholder account in accordance with a budget. For purposes of this disclosure, the term "unbanked" refers to a person who does not have a traditional banking account, or access to a traditional banking account, such as a checking account or a savings account, and therefore typically makes cash-based purchases. Embodiments described herein enable a computer system to identify a purse for a financial transaction based on one or more factors of the financial transaction, identify a plurality of parameters (e.g., a purse priority, a purse balance) associated with the identified purse, compare the purse balance with a transaction amount of the financial transaction to determine a difference between the purse balance and the transaction amount, and determine whether to approve a request for authorization of the financial transaction based on the purse priority and the difference between the purse balance and the transaction amount.

Aspects of the disclosure provide for a processing system that processes financial transactions in an environment including a plurality of devices coupled to each other via a network (e.g., the Internet). For example, an electronic funds manager device may retrieve attributes from a source device to generate one or more purses, receive a request for authorization from a merchant device and/or a financial institution device, and transmit an approval or declination of the request for authorization to the merchant device and/or the financial institution device. One or more financial transactions may be processed based on a purse priority and/or a purse balance of a purse associated with the financial transaction. In this manner, a cardholder may control use and/or access of funds in accordance with a budget with prioritized categories and, in some embodiments, be alerted or notified before entering into a financial transaction that would deviate from the budget.

The systems and processes described herein may be implemented using computer programming or engineering techniques including computer software, firmware, hardware or a combination or subset thereof. At least one technical problem with known electronic funds manager devices is that they provide limited technical budgeting support to cardholders. Moreover, with the volume of financial transactions, it can be difficult, tedious, and/or time consuming to ensure that one or more financial transactions are being processed in accordance with the budget. The embodiments described herein address that technical problem. For example, by managing electronic funds in the manner described in this disclosure, some embodiments improve cardholder confidence by processing one or more financial transactions based on one or more parameters (e.g., purse priority, purse balance) associated with a purse. Additionally, some embodiments may increase processor speed and/or reduce processor load of processing financial transactions in accordance with a budget, improve communication between systems and/or reduce network bandwidth usage by streamlining at least some communications, improve user efficiency and/or user interaction performance via user interface interaction, and/or reduce error rate by automating at least some operations. In some embodiments, the subject matter described herein may facilitate conserving memory, improving processor or data transmission security, and/or improving operating system resource allocation.

The technical effect of the systems and processes described herein is achieved by performing at least one of the following operations: a) receiving a request for authorization of a financial transaction, b) identifying a purse associated with a cardholder account, c) identifying a plurality of parameters associated with a purse, d) comparing a purse balance with a transaction amount to determine a difference between the purse balance and the transaction amount, e) determining whether to approve a request for authorization; f) determining whether a purse priority satisfies a predetermined threshold; g) determining whether a difference between a purse balance and a transaction amount satisfies a predetermined threshold, h) transmitting an instruction to present a warning, i) transmitting an instruction to present a prompt; j) receiving a response to a prompt; and k) transferring funds between a plurality of purses.

FIG. 1 is a block diagram illustrating an example environment 100 for managing funds for one or more financial transactions. The environment 100 includes a communication network 110, a payment processing network 120, and a financial institution network 130. The communication network 110 enables a financial planner device 140 to be communicatively coupled to one or more client devices 150. Example communication networks 110 include a cellular or mobile network, and the Internet. Alternatively, the communication network 110 may be any communication medium that enables the environment 100 to function as described herein. In some embodiments, a user (e.g., a cardholder) uses the client device 150 to access the financial planner device 140 and manage a cardholder account that is associated with one or more purses. A purse includes an allocation or share of funds that are reserved for, or associated with, expenditures or withdrawals corresponding to a purse category. Each purse may be associated with a respective purse category (e.g., housing, transportation, utilities, groceries, restaurants, health, hobbies, savings).

The financial planner device 140 is communicatively coupled to one or more source devices 160. In some embodiments, the financial planner device 140 is directly coupled to at least one source device 160. Additionally or alternatively, the financial planner device 140 may be coupled to at least one source device 160 via a network (e.g., a personal area network, a local area network, a wide area network, the Internet). The financial planner device 140 may retrieve, from the one or more source device 160, characteristics or attributes (e.g., demographic data, financial data) associated with a user (e.g., a cardholder) to generate and/or modify one or more purses based on the attributes.

A financial transaction processing device 170 is communicatively coupled to the financial planner device 140. In some embodiments, the financial transaction processing device 170 is directly coupled to the financial planner device 140. Additionally or alternatively, the financial transaction processing device 170 may be coupled to the financial planner device 140 via a network (e.g., a personal area network, a local area network, a wide area network, the Internet). The financial transaction processing device 170 is coupled to the financial planner device 140 to enable one or more financial transactions to be processed in accordance with a budget.

The payment processing network 120 enables the financial transaction processing device 170 to be communicatively coupled to one or more merchant devices 180. The payment processing network 120 may be a proprietary network, such as the MASTERCARD® brand payment processing network, for exchanging financial transaction data between members of the MASTERCARD® brand payment processing network, including an entity (e.g., an issuer) associated with the financial transaction processing device 170 and a merchant associated with at least one merchant device 180 (MASTERCARD® is a registered trademark of MasterCard International Incorporated located in Purchase, N.Y.). The merchant device 180 is configured to generate a request for authorization of a financial transaction and transmit the request for authorization to the financial transaction processing device 170.

The financial institution network 130 enables the financial transaction processing device 170 to be communicatively coupled to a financial institution device 190. The ACH network 130 may be a direct debit or direct credit network, such as an automated clearing house (ACH) network, for exchanging financial transaction data between participating financial institutions. For example, the financial institution network 130 may be used for direct payment of one or more bills and/or direct deposit of one or more paychecks or government payments. The financial institution device 190 may be associated with a bank or an electronic commerce (e-commerce) payment system. The financial institution device 190 is configured to generate a request for authorization of a financial transaction and transmit the request for authorization to the financial transaction processing device 170.

Figure 2:
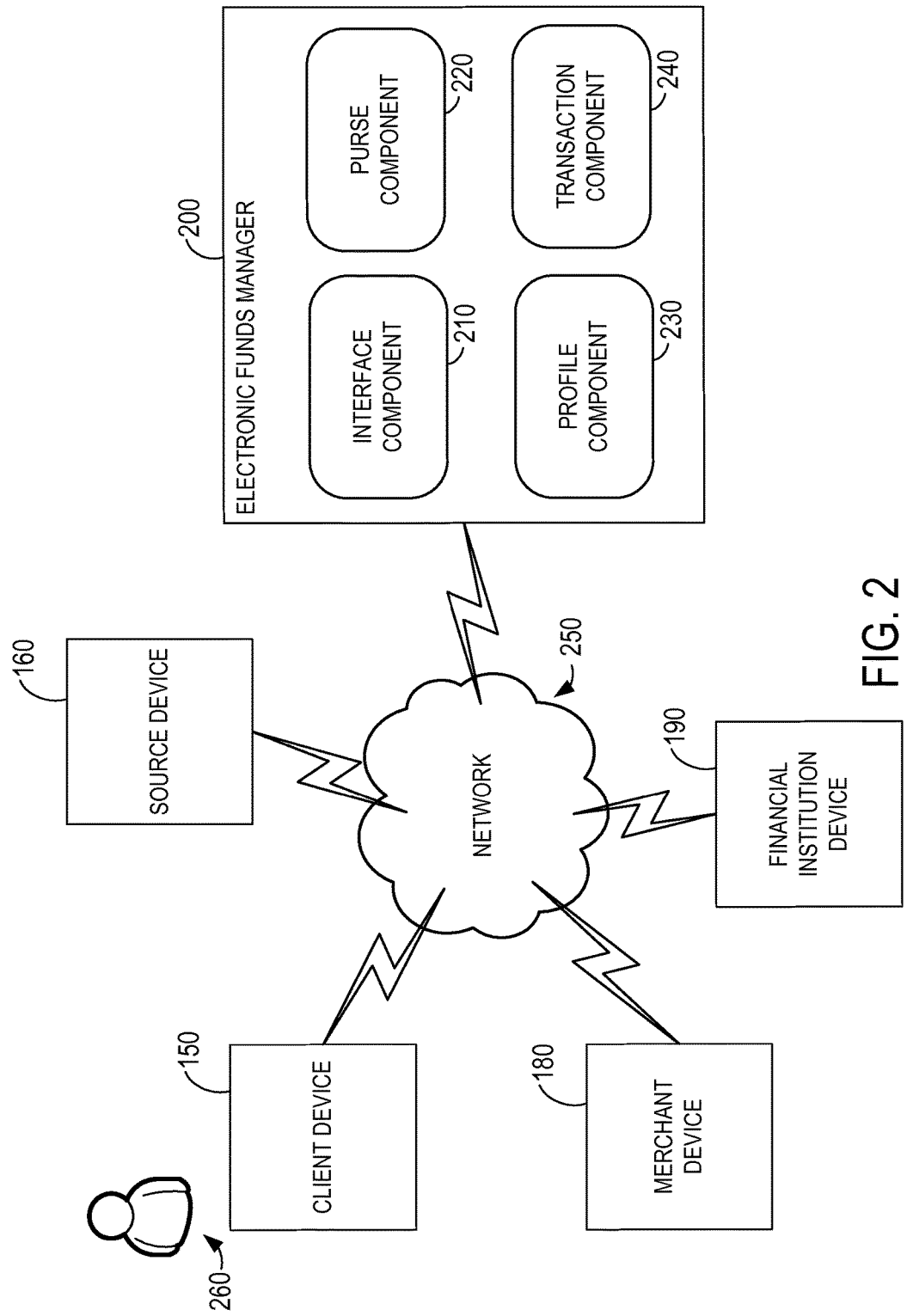
FIG. 2 is a block diagram illustrating example modules that may be used to manage funds for one or more financial transactions.

FIG. 2 is a block diagram illustrating example modules that may be used to manage funds for one or more financial transactions in the environment 100 (shown in FIG. 1) using an electronic funds manager 200. In some embodiments, the electronic funds manager 200 is associated with an issuer and includes the financial planner device 140 and/or the financial transaction processing device 170. Alternatively, the electronic funds manager 200 may be associated with any entity and/or include any combination of devices that enables the environment 100 to function as described herein. The electronic funds manager 200 includes an interface component 210, a purse component 220, a profile component 230, and/or a transaction component 240.

The interface component 210 enables the electronic funds manager 200 to receive data from and/or transmit data to another device (e.g., a client device 150, a source device 160, a merchant device 180, a financial institution device 190). For example, the interface component 210 may include a circuit and/or an application programming interface (API) that allows the electronic funds manager 200 to communicate with other devices. The interface component 210 may retrieve and/or receive from a client device 150 one or more requests for financial planner data, retrieve and/or receive from a source device 160 one or more characteristics or attributes (e.g., demographic data, financial data), receive from a merchant device 180 or a financial institution device 190 a request for authorization of a financial transaction, transmit to a client device 150 financial planner data, and/or transmit to a merchant device 180 or to a financial institution device 190 an approval or declination of a request for authorization of a financial transaction. In some embodiments, the interface component 210 is coupled to and/or communicates with the purse component 220, the profile component 230, and/or the transaction component 240 to facilitate communication between another device and the purse component 220, the profile component 230, and/or the transaction component 240.

The interface component 210 may receive data from and/or transmits data to another device via a network 250 (e.g., a personal area network, a local area network, a wide area network, the Internet). The client device 150, the source device 160, the merchant device 180, and/or the financial institution device 190 may be a desktop computer, a laptop, a mobile device, a tablet, and/or any other computing device that is configured to communicate with or access the electronic funds manager 200 via the network 250.

A user 260 (e.g., a cardholder) may use the client device 150 to access the electronic funds manager 200 via the interface component 210. The client device 150 allows the user 260 to set and/or manage a budget. Budget data may be transmitted to the client device 150 (e.g., via the interface component 210) and presented to the user 260 at the client device 150. For example, a dashboard including text and/or graphics for each purse may be displayed to indicate a respective status of the purses. A status may be presented as a light on a traffic signal (e.g., a green light for a purse balance being at or below a first threshold, a yellow light for the purse balance being between the first threshold and a second threshold, and a red light for being at or above the second threshold). Additionally or alternatively, the status may be presented as one of a plurality of shapes or symbols (e.g., a green circle for a purse balance being at or below a first threshold, a yellow triangle for the purse balance being between the first threshold and a second threshold, and a red octagon for being at or above the second threshold). While some of the embodiments described herein describe three categories of statuses, it is contemplated that a status may be categorized in one of any number of categories. For example, a bar graph, a five-star rating, and/or a ten-point scale may be used to present a status of a purse.

In some embodiments, the client device 150 may allow the user 260 to make a payment to a merchant associated with the merchant device 180. For example, the user 260 may use the client device 150 to transmit financial transaction data to the merchant device 180 and/or the financial transaction processing computing device 170 (shown in FIG. 1). Additionally or alternatively, the client device 150 may allow the user 260 to deposit, withdraw, and/or transfer funds to and/or from a financial account maintained at or by the financial institution device 190. For example, the user 260 may use the client device 150 to transmit financial transaction data to the financial institution device 190 and/or the financial transaction processing computing device 170 (shown in FIG. 1).

The purse component 220 is configured to communicate with the interface component 210, and manage one or more purses associated with a cardholder account. Each purse includes or is associated with one or more parameters that allows funds for one or more financial transactions to be strategically managed based on the parameters. The parameters may include, for example, a purse balance (e.g., an amount of funds allocated to the purse), a purse category (e.g., housing, transportation, utilities, groceries, restaurants, health, hobbies, savings), a purse priority, and the like. In some embodiments, the purse priority may be associated with one or more permissions and/or restrictions that control access to at least some funds allocated to the corresponding purse.

For example, a first purse of the one or more purses may be a "housing" purse associated with a higher priority (e.g., a first purse priority) and having first funds allocated to the first purse (e.g., a first purse balance), and a second purse of the one or more purses may be a "hobbies" purse associated with a lower priority (e.g., a second purse priority) and having second funds allocated to the second purse (e.g., a second purse balance). Funds allocated to a higher priority purse may be more fixed (e.g., more difficult to transfer or withdraw) than funds allocated to a lower priority purse to ensure that use of funds allocated to the higher priority purse are less likely to deviate from an established budget than use of funds allocated to the lower priority purse. The purses may be associated with any category, including housing (e.g., mortgage, rent), transportation (e.g., car payment, fare for mass transportation, auto insurance, parking), utilities (e.g., electric, water, gas, sanitation), food (e.g., groceries, restaurants), health (e.g., health insurance, doctor visits, prescriptions, gym memberships), or any other category that allows a user to manage funds for one or more financial transactions.

The profile component 230 is configured to communicate with the interface component 210 and/or the purse component 220, and manage a profile associated with a cardholder account. The profile includes or is associated with one or more characteristics or attributes that allows funds for one or more financial transactions to be strategically managed based on the attributes. The attributes may include, for example, demographic data associated with the cardholder (e.g., race, gender, geolocation, level of education, marital status, number of dependents, home ownership status), financial data associated with the cardholder (e.g., income history, spending history), and the like. The profile component 230 may retrieve and/or receive one or more attributes from one or more source devices 160 (e.g., via the interface component 210) including, for example, a digital wallet system (e.g., a MASTERPASS® brand database; MASTERPASS® is a registered trademark of MasterCard International Incorporated located in Purchase, N.Y.).

In some embodiments, the attributes are analyzed and/or processed to generate and/or modify one or more purses and/or establish and/or modify one or more purse priorities for one or more purses. Additionally or alternatively, attributes associated with one or more comparable cardholders may be processed to generate and/or modify one or more purses for the cardholder account and/or establish and/or modify one or more purse priorities for one or more purses. A comparable cardholder may be any cardholder having one or more attributes that are the same as or substantially similar to the attributes of the cardholder associated with the cardholder account.

The transaction component 240 is configured to communicate with the interface component 210, the profile component 230, and/or the transaction component 240 to transfer funds between a plurality of financial accounts. In some embodiments, the transaction component 240 transfers at least some funds to and/or from a financial account based on a purse priority, a purse balance, and/or a transaction amount of a financial transaction associated with a request for authorization. For example, the request for authorization of the financial transaction may be approved or declined based on the purse priority and a difference between the purse balance and the transaction amount. The purse priority may allow a cardholder to access and/or restrict the cardholder from accessing at least some funds allocated to a corresponding purse.

The financial transaction may be a merchant transaction (e.g., purchase/sale of a good or service), a financial institution transaction (e.g., balance transfer, bill payment, wire transfer), or any other credit or debit of funds associated with a cardholder account. In some embodiments, a financial transaction may be analyzed and/or processed to determine a purse category associated with the financial transaction, and at least some funds may be transferred to and/or from a corresponding purse based on a purse balance and/or the purse priority. The transaction component 240 may determine whether a purse priority satisfies a first predetermined threshold and/or determines whether the difference between the purse balance and the transaction amount satisfies a second predetermined threshold to determine whether to approve or decline the request for authorization of the financial transaction.

For example, if the purse priority satisfies the first predetermined threshold (e.g., the purse priority is higher than the predetermined threshold) and the difference satisfies the second predetermined threshold (e.g., the purse balance is greater than or equal to the transaction amount), the request for authorization is approved. In at least some embodiments, the transaction component 240 may approve the request for authorization if the purse priority does not satisfy the first predetermined threshold (e.g., the purse priority is lower than the predetermined threshold). For example, in at least some embodiments, the transaction component 240 may approve the request for authorization when the difference satisfies the second predetermined threshold (e.g., the purse balance is greater than or equal to the transaction amount), whether or not the purse priority satisfies the first predetermined threshold.

In some embodiments, the transaction component 240 provides a warning to the user 260. If the difference does not satisfy a second predetermined threshold (e.g., the difference is less than a predetermined value), an instruction to present a warning associated with the difference may be transmitted to the client device 150 (e.g., via the interface component 210). For example, if the difference is less than a predetermined positive value (e.g., approving the request would result in a purse balance that is less than or equal to a predetermined threshold), the warning may read, "You are approaching your budget for this category" and the like. For another example, if the difference is less than zero (e.g., the purse balance is less than the transaction amount), the warning may read, "You have exceeded your budget for this category" and the like. In at least some embodiments, the warning may be determined based on whether the difference does not satisfy one or more second predetermined thresholds (e.g., the difference is less than a predetermined value, the purse balance is less than the transaction amount) and whether or not the purse priority satisfies the first predetermined threshold.

The transaction component 240 is configured to communicate with the interface component 210, the profile component 230, and/or the transaction component 240 to transfer funds between a plurality of purses. For example, the transaction component 240 may be used to transfer a desired amount of funds to and/or from a purse to increase and/or decrease a purse balance of the purse. In some embodiments, the transaction component 240 may be used to periodically transfer a desired amount of funds to and/or from a purse to increase and/or decrease a purse balance of the purse on a predetermined schedule. For example, a purse may be allocated a fixed amount of funds each period (e.g., day, week, bi-week, month, year) to increase the purse balance by the fixed amount of funds. For another example, a purse may be allocated a variable amount of funds each period to increase the purse balance by various amounts of funds. Additionally or alternatively, funds may be transferred to and/or from a purse at regular intervals (e.g., every period) and/or at irregular intervals (e.g., each time funds are deposited).

In some embodiments, a purse is associated with a predetermined threshold that restricts an amount of funds that may be transferred into the purse (e.g., an authorized amount). For example, a user (e.g., a cardholder) may allocate any amount of funds to a purse up to an authorized amount (e.g., a fixed number). Similarly, a user may withdraw any amount of funds from a purse up to an authorized amount (e.g., a fixed number). For another example, a user may allocate any amount of funds to a purse up to an amount that would result in a purse balance to be greater than an authorized amount should the funds be allocated to the purse (e.g., the allocatable amount is a variable number that is dependent on the authorized amount). Similarly, a user may withdraw any amount of funds from a purse up to an amount that would result in a purse balance to be less than an authorized amount should the funds be withdrawn from the purse (e.g., the withdrawable amount is a variable number that is dependent on the authorized amount).

An amount of funds may be transferred to a purse such that the purse balance is increased to be greater than or equal to a predetermined value (e.g., a transaction amount). For example, the transaction component 240 may transmit an instruction to prompt a user (e.g., a cardholder) to approve a transfer of funds, and the funds may be transferred to the purse upon receiving the approval. In some embodiments, a funding purse (e.g., the purse from which the funds are being withdrawn) may be selected by a user 260 at the client device 150. Alternatively, the funding purse may be automatically selected by the transaction component 240 based on a purse priority associated with the funding purse.

For example, a second purse that is associated with a purse priority lower than the purse priority of the purse may be selected to be a funding purse. Additionally or alternatively, the funding purse may be automatically selected based on a purse balance of the funding purse. For example, a second purse having a purse balance that is greater than a predetermined threshold, fixed or relative, may be selected to be a funding purse. The transaction component 240 may determine whether a purse balance of the funding purse is greater than or equal to a predetermined value (e.g., the transaction amount, an amount that would result in a purse balance of the purse to be greater than or equal to the transaction amount), and transmits an instruction to prompt the user to approve the transfer of funds and/or transfers the funds upon determining that the purse balance of the funding purse is greater than or equal to the predetermined value.

For example, a first purse (e.g., a housing purse) may be allocated a fixed amount of funds every month, and access to the allocated funds (e.g., for deposit, for withdrawal, for transfer) may be restricted for any purpose other than the purpose associated with the first purse (e.g., housing). For another example, a second purse (e.g., a hobbies purse) may be allocated a variable amount of funds at variable intervals, up to an authorized amount, and access to at least some of the allocated funds may be allowed for purposes that are in compliance with one or more predetermined thresholds associated with the second purse.

Figure 3:
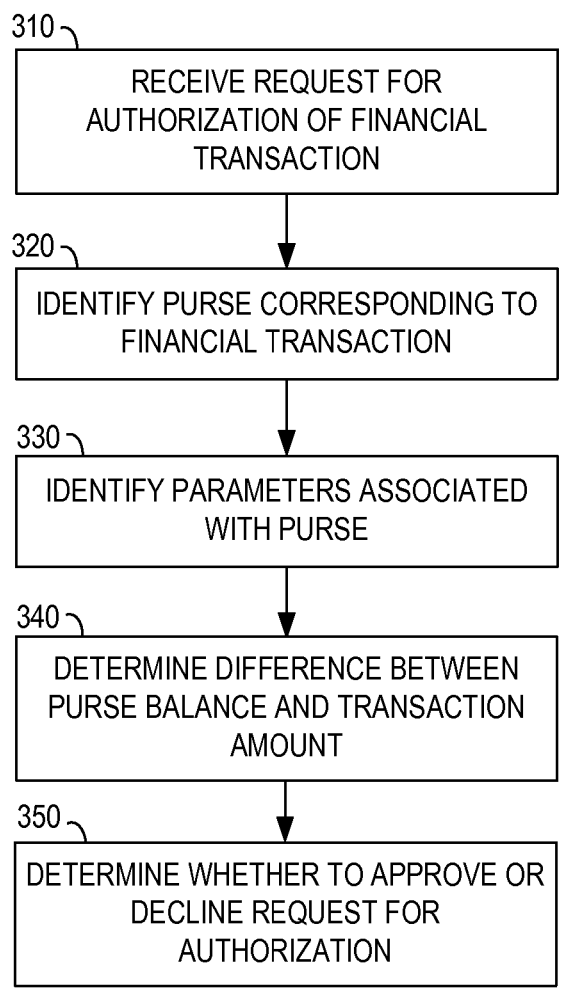
FIG. 3 is a flowchart of an example method of managing funds for one or more financial transactions in an environment, such as the environment shown in FIG. 1.

FIG. 3 is a flowchart of an example method 300 of managing funds for one or more financial transactions in the environment 100 (shown in FIG. 1). A financial planner device 140 receives at 310 a request for authorization of a financial transaction. In some embodiments, an electronic funds manager 200 includes the financial planner device 140 and receives the request for authorization. The request for authorization may be transmitted from a financial transaction processing device 170, which received the request for authorization from a merchant device 180 and/or a financial institution device 190. Alternatively, the request for authorization may be transmitted from the merchant device 180 and/or the financial institution device 190.

In some embodiments, the financial planner device 140 analyzes or processes the financial transaction to identify one or more factors associated with the financial transaction and, based on the one or more identified factors, identify a purse category associated with the financial transaction. Factors may include, for example, a transaction time, a transaction date, a transaction amount, a transaction location, a merchant identification, a merchant category, and the like.

Based on at least one of the identified factors, the financial planner device 140 identifies at 320, from one or more purses associated with a cardholder account, a purse associated with the financial transaction, and identifies at 330 a plurality of parameters associated with the purse. Parameters may include, for example, a purse category, a purse priority, and a purse balance. The purse balance is compared with the transaction amount to determine at 340 a difference between the purse balance and the transaction amount. Based on the purse priority and the difference between the purse balance and the transaction amount, financial planner device 140 determines at 350 whether to approve or decline the request for authorization.

Figure 4:
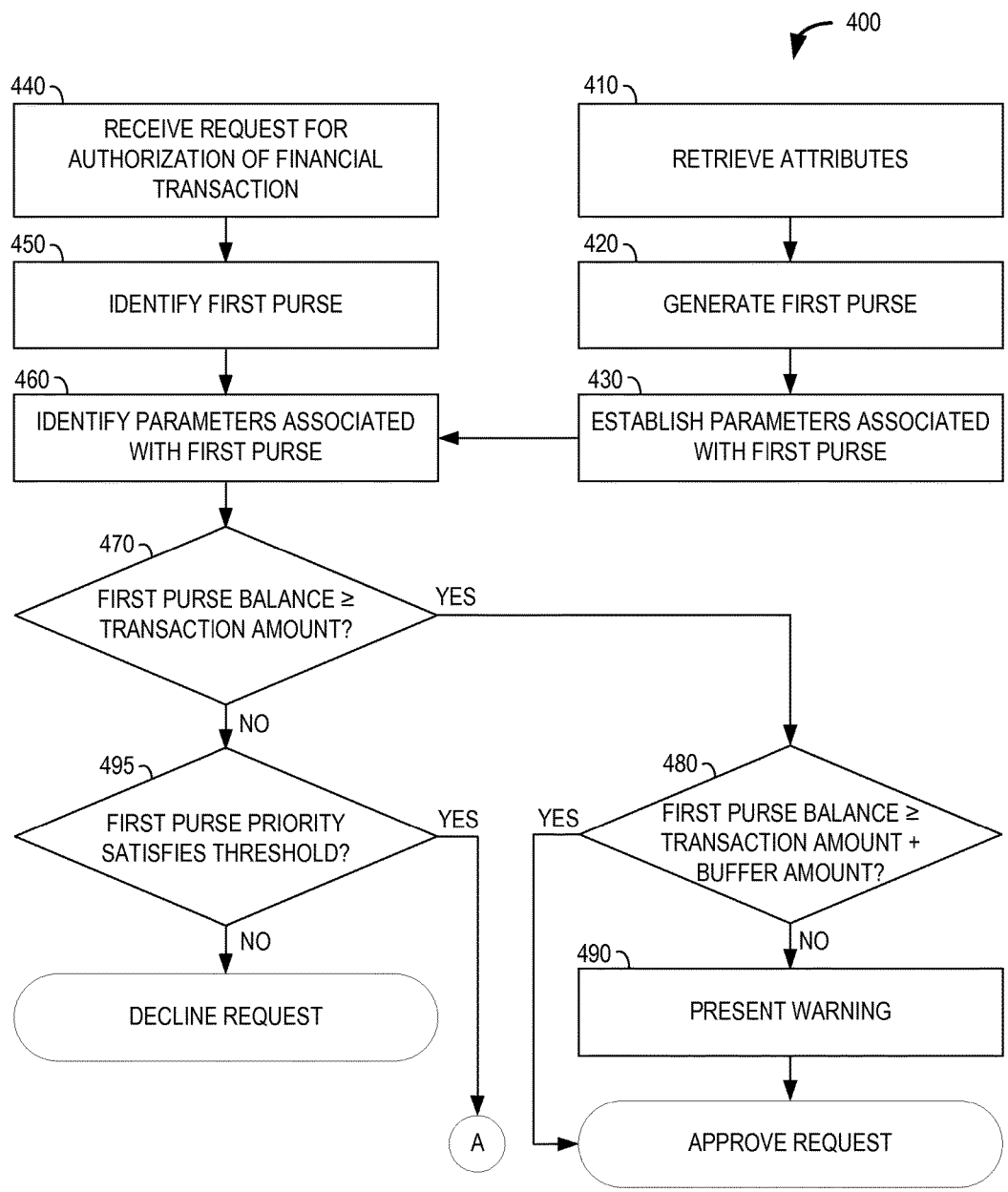
FIGS. 4 and 5 are partial flowcharts of an example method of managing funds for one or more financial transactions using one or more modules, such as the modules shown in FIG. 2.

FIG. 4 is a detailed flowchart of an example method 400 of managing funds for one or more financial transactions using an electronic funds manager 200 (shown in FIG. 2). The electronic funds manager 200 retrieves at 410 one or more attributes (e.g., demographic data, financial data). In some embodiments, the attributes may be retrieved from a one or more source devices 160. Additionally or alternatively, the attributes may be retrieved from a memory area at the electronic funds manager 200 (e.g., attributes associated with a previously-processed financial transaction). For example, the attributes may be retrieved from a digital wallet system (e.g., a MASTERPASS® brand database). Attributes may include, for example, demographic data, financial data, and the like.

One or more purses may be generated at 420. In some embodiments, the electronic funds manager 200 generates at least a first purse based on the attributes. For example, the electronic funds manager 200 may identify that a spending history includes transaction data for a housing-related expense (e.g., mortgage payment), a food-related expense (e.g., groceries, restaurants), and a hobbies-related expense (e.g., sports equipment, race registrations), and generate a housing purse, a food purse, and a hobbies purse based on the spending history. Additionally or alternatively, the electronic funds manager 200 may identify that a spending history for one or more comparable cardholders includes transaction data for a transportation-related expense (e.g., car payment), and generate a transportation purse based on the comparable cardholders' spending history.

One or more parameters are established at 430 for one or more purses. Parameters may include, for example, a purse balance, a purse category, a purse priority, a threshold, and the like. For example, the electronic funds manager 200 may associate a higher purse priority to the housing purse and a lower purse priority to the hobbies purse based on user input and/or one or more purse priorities of comparable cardholders. Additionally or alternatively, one or more purses may be allocated with a respective amount of funds and/or a respective funding schedule to set a budget for a category associated with the purse. For example, a housing purse may be allocated a fixed amount of funds every month, and a hobbies purse may be allocated a lesser amount of funds every other month during the first half of the year (e.g., January through June) and a greater amount of funds every month during the second half of the year (e.g., July through December). Like the purse priorities, the electronic funds manager 200 may associate other parameters (e.g., a fund allocation schedule) based on user input and/or one or more parameters of comparable cardholders. A user may establish (e.g., via a client device 150), for example, one or more parameters, such as a purse priority or a purse threshold.

The electronic funds manager 200 receives at 440 a request for authorization of a financial transaction. The financial transaction may be for any credit or debit of funds including a merchant transaction or a financial institution transaction. The financial transaction is analyzed and/or processed to identify one or more factors associated with the financial transaction and, based on the identified factors, identify a corresponding purse (e.g., a first purse) at 450. For example, the electronic funds manager 200 may identify and/or determine a merchant category associated with the financial transaction, and identify a purse that is associated with a corresponding purse category.

One or more parameters associated with the purse may be identified at 460 to facilitate determining whether to approve or decline the request for authorization. In some embodiments, the electronic funds manager 200 identifies a transaction amount associated with the financial transaction, and determines whether the purse includes sufficient funds to withdraw a requested quantity of electronic funds (e.g., the transaction amount) without resulting in a negative balance. For example, the electronic funds manager 200 may determine at 470 whether a purse balance associated with the purse is greater than or equal to the transaction amount. If the purse balance is greater than or equal to the transaction amount, the request for authorization may be approved.

In some embodiments, the electronic funds manager 200 may determine whether the purse balance is approaching an actionable predetermined threshold. For example, the electronic funds manager 200 may determine at 480 whether the purse balance is greater than or equal to the transaction amount plus a predetermined buffer amount. If the purse balance is greater than or equal to the transaction amount plus the buffer amount, the request for authorization may be approved. If the purse balance is greater than or equal to the transaction amount but less than the transaction amount plus the buffer amount, the electronic funds manager 200 may present at 490 a warning to a user (e.g., the user 260). For example, the warning may read, "You are approaching your budget for this category." In some embodiments, the electronic funds manager 200 may approve the request for authorization with the presentation of the warning. Alternatively, the electronic funds manager 200 may prompt the user to confirm the request for authorization (e.g., "Would you like to proceed with this transaction?") and approve the request for authorization upon receiving a confirmation of the request for authorization. If the user does not confirm the request for authorization, the electronic funds manager 200 declines the request for authorization.

If the purse balance is less than the transaction amount, the request for authorization may be declined. In some embodiments, the electronic funds manager 200 may approve the request for authorization despite determining that the purse does not include sufficient funds to withdraw a requested quantity of electronic funds without resulting in a negative balance. For example, the electronic funds manager 200 may determine at 495 whether a purse priority associated with the purse satisfies a predetermined threshold, and, if the purse priority satisfies the predetermined threshold, access or use one or more second purses to transfer funds from the second purses to the first purse. If the purse priority does not satisfy the predetermined threshold, the request for authorization is declined. On the other hand, if the purse priority satisfies the predetermined threshold, the evaluation continues to a method 500 of managing funds for one or more financial transactions where the purse priority satisfies the predetermined threshold and the purse balance is less than the transaction amount.

Figure 5:
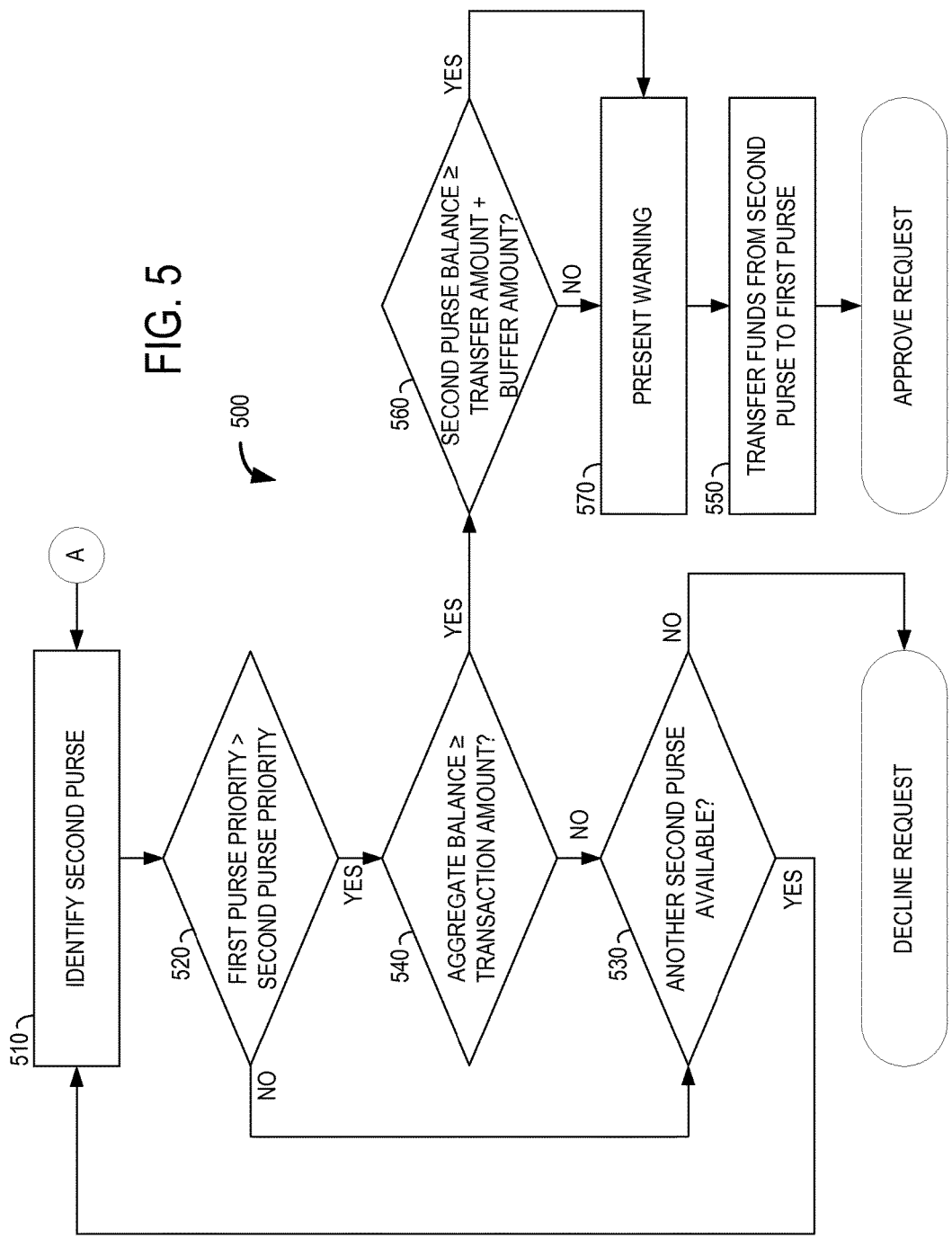

FIG. 5 is a detailed flowchart of the method 500 of managing funds for one or more financial transactions using the electronic funds manager 200. The electronic funds manager 200 identifies at 510 another purse (e.g., a second purse) that may be used to transfer electronic funds to the first purse. In some embodiments, a second purse may be selected from a drop-down menu. Alternatively, the electronic funds manager 200 may automatically identify the second purse based on attributes of the user and/or attributes of comparable cardholders.

The electronic funds manager 200 may determine at 520 whether the second purse is associated with a purse priority that is less than or equal to a purse priority associated with the first purse. If the purse priority of the second purse is greater than the purse priority of the first purse, the second purse is not selected and the electronic funds manager 200 determines at 530 whether another second purse is available for consideration. If the cardholder account is not associated with any other purses, the electronic funds manager 200 determines that there is no other purse that may be used to transfer electronic funds to the first purse and, thus, declines the request for authorization. If another second purse is available for consideration, the electronic funds manager 200 may determine at 520 whether the second purse is associated with a purse priority that is less than or equal to a purse priority associated with the first purse.

The electronic funds manager 200 determines whether the second purse includes sufficient funds to transfer a requested quantity of electronic funds to the first purse and approve the request for authorization. For example, the electronic funds manager 200 may determine at 540 whether a purse balance associated with the second purse is greater than or equal to the transaction amount. In some embodiments, the electronic funds manager 200 may determine whether an aggregate balance (e.g., first purse balance plus second purse balance) is greater than or equal to the transaction amount. If the second purse does not include sufficient funds to transfer to the first purse, the second purse is not selected and the electronic funds manager 200 determines at 530 whether another second purse is available for consideration. If the second purse includes sufficient funds to transfer to the first purse, funds are transferred at 550 from the second purse to the first purse (e.g., the second purse balance is decreased by a transfer amount and the first purse balance is increased by the transfer amount) such that the first purse has sufficient funds to withdraw a requested quantity of electronic funds without resulting in a negative balance and/or the request for authorization may be approved.

In some embodiments, the electronic funds manager 200 may determine whether any of the purse balances (e.g., the first purse balance, the second purse balance) is approaching an actionable predetermined threshold. For example, the electronic funds manager 200 may determine at 560 whether the purse balance of the second purse is greater than or equal to the transaction amount plus a predetermined buffer amount. If the second purse balance is greater than or equal to the transaction amount plus the buffer amount, the request for authorization may be approved. If the second purse balance is greater than or equal to the transaction amount but less than the transaction amount plus the buffer amount, the electronic funds manager 200 may present at 570 a warning to a user (e.g., the user 260). For example, the warning may read, "You have met or exceeded your budget for [first category]. You are approaching your budget for [second category]." In some embodiments, the electronic funds manager 200 may approve the request for authorization with the presentation of the warning. Alternatively, the electronic funds manager 200 may prompt the user to confirm the request for authorization (e.g., "Would you like to proceed with this transaction?") and approve the request for authorization upon receiving a confirmation of the request for authorization. If the user does not confirm the request for authorization, the electronic funds manager 200 declines the request for authorization.

Figure 6:
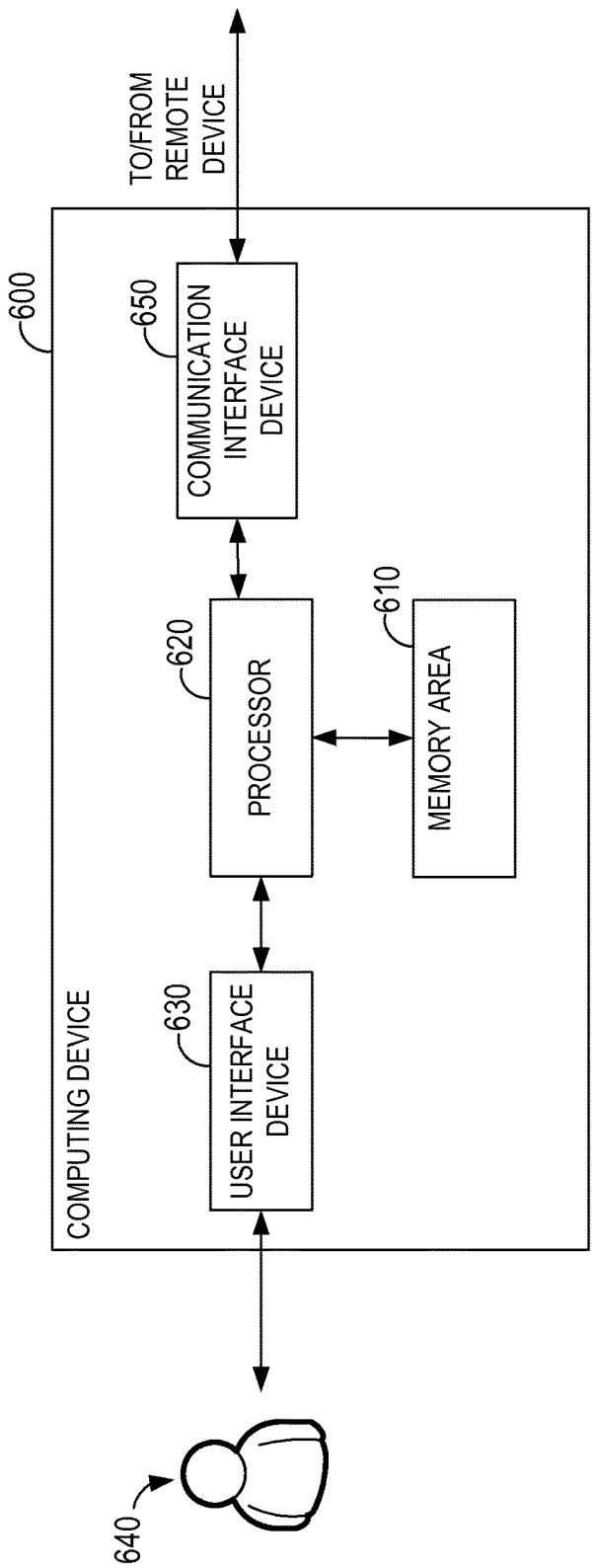
FIG. 6 is a block diagram illustrating an example computing device that may be used to manage funds for one or more financial transactions.

FIG. 6 is a block diagram illustrating an example computing device 600 that may be used to manage funds for one or more financial transactions in the environment 100 (shown in FIG. 1). While some embodiments of the disclosure are illustrated and described herein with reference to the computing device 600 being or including an electronic funds manager 200 (shown in FIG. 2), aspects of the disclosure are operable with any computing device (e.g., financial planner device 140, client device 150, source device 160, financial transaction processing device 170, merchant device 180, financial institution device 190) that executes instructions to implement the operations and functionality associated with the computing device 600.

For example, the computing device 600 may include a mobile device, a mobile telephone, a phablet, a tablet, a portable media player, a netbook, a laptop, a desktop computer, a computing pad, a kiosk, a tabletop device, an industrial control device, and other computing devices. The computing device 600 may represent a group of processing units or other computing devices. Additionally, any computing device described herein may be configured to perform any operation described herein including one or more operations described herein as being performed by another computing device.

The computing device 600 includes one or more computer-readable media, such as a memory area 610 storing computer-executable instructions, transaction data (e.g., transaction time, transaction date, transaction amount, transaction location), merchant information (e.g., merchant identification, merchant category), purse data (e.g., purse category, purse priority, purse balance, predetermined thresholds, warnings), profile data (e.g., race, gender, geolocation, level of education, marital status, number of dependents, home ownership status, income history, spending history), and other data, and one or more processors 620 programmed to execute the computer-executable instructions for implementing aspects of the disclosure. For example, the memory area 610 may include an interface component 210 (shown in FIG. 2), a purse component 220 (shown in FIG. 2), a profile component 230 (shown in FIG. 2), and/or a transaction component 240 (shown in FIG. 2). The memory area 610 includes any quantity of media associated with or accessible by the computing device 600. The memory area 610 may be internal to the computing device 600 (as shown in FIG. 6), external to the computing device 600 (not shown), or both (not shown).

The processor 620 includes any quantity of processing units, and the instructions may be performed by the processor 620 or by multiple processors within the computing device 600 or performed by a processor external to the computing device 600. The processor 620 is programmed to execute instructions such as those illustrated in the figures (e.g., FIGS. 3, 4, and/or 5).

Upon programming or execution of these instructions, the processor 620 is transformed into a special purpose microprocessor or machine. For example, the interface component 210, when executed by the processor 620, causes the processor 620 to receive a request for authorization of a financial transaction, transmit an instruction to present a warning, transmit an instruction to present a prompt, receive a response to a prompt, and/or retrieve one or more attributes associated with a profile; the purse component 220, when executed by the processor 620, causes the processor 620 to generate a purse, establish one or more parameters associated with a purse, identify one or more parameters associated with a purse, and manage one or more purses; the profile component 230, when executed by the processor 620, causes the processor 620 to analyze one or more attributes associated with a profile, identify a purse associated with a cardholder account, and manage one or more profiles; and the transaction component 240, when executed by the processor 620, causes the processor 620 to compare a purse balance with a transaction amount to determine a difference between the purse balance and the transaction amount, determine whether to approve a request for authorization, determine whether a purse priority satisfies a predetermined threshold, determine whether a difference between a purse balance and a transaction amount satisfies a predetermined threshold, and transfer funds between a plurality of purses. Although the processor 620 is shown separate from the memory area 610, embodiments of the disclosure contemplate that the memory area 610 may be onboard the processor 620 such as in some embedded systems.

The computing device 600 includes at least one user interface 630 for exchanging data between the computing device 600 and a user. For example, the user interface 630 includes or is coupled to a presentation device configured to present information, such as text, images, audio, video, graphics, alerts, and the like, to the user. The presentation device may include, without limitation, a display, a speaker, or a vibrating component. Additionally or alternatively, the user interface 630 may include or be coupled to an input device (not shown) configured to receive information, such as user commands, from the user. The input device may include, without limitation, a controller, a camera, a microphone, or an accelerometer. In at least some embodiments, the presentation device and the input device are integrated in a common user interface 630 configured to present information to the user and receive information from the user. For example, the user-interface device may include, without limitation, a capacitive touch screen display or a controller including a vibrating component. In some embodiments, the user may interface with the computing device 600 via another computing device.

The computing device 600 includes at least one communication interface for exchanging data between the computing device 600 and a computer-readable media or another computing device. For example, the computing device 600 may be coupled to a server, a financial transaction processing computing device, a financial transaction device (e.g., a POS terminal), a detection device, and/or a detected device via a network and/or the Internet. Communication between the computing device 600 and a computer-readable media or another computing device may occur using any protocol or mechanism over any wired or wireless connection.

The block diagram of FIG. 6 is merely illustrative of an example system that may be used in connection with one or more embodiments of the disclosure and is not intended to be limiting in any way. Further, peripherals or components of the computing devices known in the art are not shown, but are operable with aspects of the disclosure. At least a portion of the functionality of the various elements in FIG. 6 may be performed by other elements in FIG. 6, or an entity (e.g., processor, web service, server, applications, computing device, etc.) not shown in FIG. 6.

Figure 7:
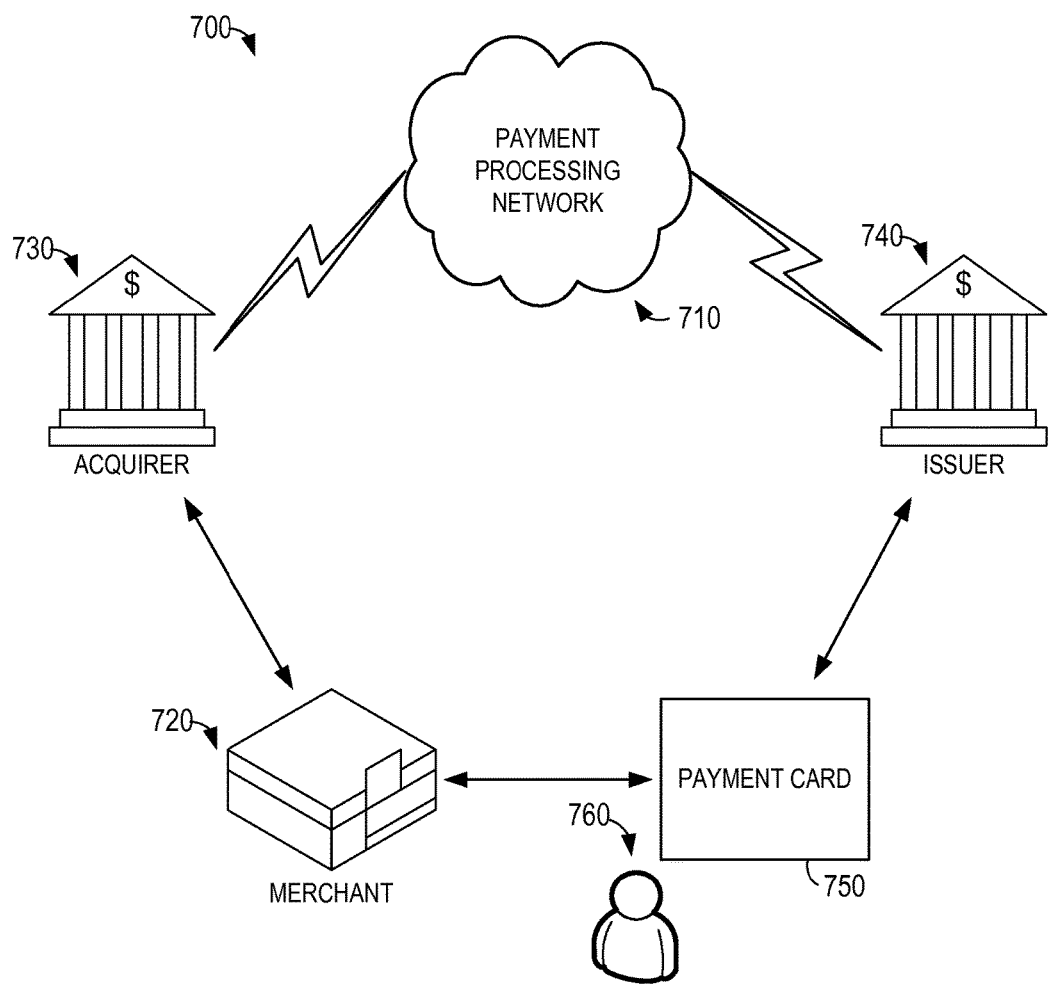
FIG. 7 is a block diagram illustrating an example environment for processing one or more financial transactions.

FIG. 7 is a block diagram illustrating an example system or environment 700 for processing one or more financial transactions. The environment 700 includes a processing network 710, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 700 includes one or more merchants 720 that accept payment via the processing network 710. To accept payment via the processing network 710, the merchant 720 establishes a financial account with an acquirer 730 that is a member of the processing network 710. The acquirer 730 is a financial institution that maintains a relationship with one or more merchants 720 to enable the merchants 720 to accept payment via the processing network 710. The acquirer 730 may also be known as an acquiring bank, a processing bank, or a merchant bank.

The environment 700 includes one or more issuers 740 that issue or provide payment cards 750 (e.g., credit card, debit card, prepaid card, and the like) or other payment products to one or more cardholders 760 or, more broadly, account holders ("cardholder" and "account holder" may be used interchangeably herein). The issuer 740 is a financial institution that maintains a relationship with one or more cardholders 760 to enable the cardholders 760 to make a payment using the payment card 750 via the processing network 710.

A cardholder 760 uses a payment product, such as a payment card 750, to purchase a good or service from a merchant 720. In some embodiments, the payment card 750 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 750 to purchase a good or service from a merchant 720. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 760 may use any payment product that is linked or associated with a corresponding financial account maintained by an issuer 740. As described herein, the term "payment card" includes credit cards, debit cards, prepaid cards, digital cards, smart cards, and any other payment product that is linked or associated with a corresponding financial account maintained by an issuer 740. Payment cards 750 may have any shape, size, or configuration that enables the environment 700 to function as described herein.

A cardholder 760 may present the merchant 720 with a payment card 750 to make a payment to the merchant 720 in exchange for a good or service. Alternatively, the cardholder 760 may provide the merchant 720 with account information associated with the payment card 750 without physically presenting the payment card 750 (e.g., for remote financial transactions, including e-commerce transactions, card-not-present transactions, or card-on-file transactions). Account information may include a name of the cardholder 760, an account number, an expiration date, a security code (such as a card verification value (CVV), a card verification code (CVC), and the like), and/or a personal identification number (PIN).

The merchant 720 requests authorization from an acquirer 730 for at least the amount of the purchase. The merchant 720 may request authorization using any financial transaction computing device configured to transmit account information of the cardholder 760 to one or more financial transaction processing computing devices of the acquirer 730. For example, the merchant 720 may request authorization through a point-of-sale (POS) terminal, which reads account information of the cardholder 760 from a microchip or magnetic stripe on the payment card 750, and transmits the cardholder's account information to the one or more financial transaction processing computing devices of the acquirer 730. For another example, the POS terminal reads account information of the cardholder 760 from a device configured to communicate with the POS terminal using contactless payment technology, and transmits the cardholder's account information to one or more financial transaction processing computing devices of the acquirer 730.

Using the processing network 710, the financial transaction processing computing devices of the acquirer 730 communicate with one or more financial transaction processing computing devices of an issuer 740 to determine whether the account information of the cardholder 760 matches or corresponds with the account information of the issuer 740, whether the account is in good standing, and/or whether the purchase is covered by (e.g., less than) a credit line or account balance associated with the financial account. Based on these determinations, the financial transaction processing computing devices of the issuer 740 determine whether to approve or decline the request for authorization from the merchant 720.

If the request for authorization is declined, the merchant 720 is notified as such, and may request authorization from the acquirer 730 for a lesser amount or request an alternative form of payment from the cardholder 760. If the request for authorization is approved, an authorization code is issued to the merchant 720, and the cardholder's available credit line or account balance is decreased. The financial transaction is then settled between the merchant 720, the acquirer 730, the issuer 740, and/or the cardholder 760. Settlement typically includes the acquirer 730 reimbursing the merchant 720 for selling the good or service, and the issuer 740 reimbursing the acquirer 730 for reimbursing the merchant 720. When a credit card is used, the issuer 740 may bill the cardholder 760 to settle a financial account associated with the cardholder 760. When a debit or prepaid card is used, the issuer 740 may automatically withdraw funds from the account.

The subject matter described herein enables a cardholder to manage funds for one or more financial transactions to keep a budget. An electronic funds manager includes and/or is integrated with the financial transaction processing system to allow a cardholder to manage a budget with a concept of purses holding funds dedicated to a predetermined usage. The purses are associated with an active value (e.g., a purse balance) and one or more expected spending patterns (e.g., thresholds). In some embodiments, the electronic funds manager may be used for a payroll card, a debit card, a prepaid card, and/or an electronic wallet. The electronic funds manager enables a cardholder to establish and implement financial planning best practices, such as priority of spending. In some embodiments, the electronic funds manager learns from the income patterns and/or spending patterns of a cardholder based on network transactions, recurring transactions, income, other expenses, and/or cardholder demographics. In this manner, a cardholder is enabled to efficiently and effectively manage a budget.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, embodiments of the disclosure are capable of implementation with numerous other general purpose or special purpose computing system environments, configurations, or devices.

Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for managing funds for one or more financial transactions. For example, the elements illustrated in FIG. 1, 2, 6, or 7 such as when encoded to perform the operations illustrated in FIG. 3, 4, or 5 constitute at least an example means for receiving a request for authorization of a financial transaction (e.g., interface component 210), an example means for identifying a purse associated with a cardholder account (e.g., profile component 230), an example means for identifying a plurality of parameters associated with a purse (e.g., purse component 220), an example means for comparing a purse balance with a transaction amount to determine a difference between the purse balance and the transaction amount (e.g., transaction component 240), and/or an example means for determining whether to approve the request for authorization (e.g., transaction component 240).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computer-implemented method for managing funds for one or more financial transactions, the computer-implemented method comprising:

receiving, from a financial transaction processing computing device, a request for authorization of a first financial transaction of the one or more financial transactions, the first financial transaction associated with one or more factors including a transaction amount;

based on the one or more factors, identifying a first purse associated with a cardholder account, the cardholder account associated with a plurality of electronic purses, the plurality of purses being generated based at least on a spending history associated with the cardholder account, each of the plurality of purses being associated with a different purse category based at least on the spending history;

identifying a plurality of parameters associated with the first purse, the plurality of parameters including a first purse priority and a first purse balance;

comparing the first purse balance with the transaction amount and automatically determining, by an electronic funds manager device, a difference between the first purse balance and the transaction amount; and based on condition that the first purse priority satisfies a first threshold and the difference between the first purse balance and the transaction amount satisfies a second threshold, approving, by the electronic funds manager device, the request for authorization.

2. The computer-implemented method of claim 1, wherein the one or more factors include one or more of the following: a transaction time, a transaction date, and a transaction location.

3. The computer-implemented method of claim 1, wherein approving the request includes, on condition that the first purse priority satisfies the first threshold and the difference does not satisfy the second threshold, approve the request for authorization and transmit an instruction to present a warning associated with the difference.

4. The computer-implemented method of claim 1, wherein approving the request includes, on condition that the first purse priority satisfies the first threshold and the difference does not satisfy the second threshold, transfer funds from a second purse to the first purse such that the first purse balance is increased, and approve the request for authorization.

5. The computer-implemented method of claim 4, wherein approving the request includes determining that a second purse priority associated with the second purse does not satisfy the first threshold.

6. The computer-implemented method of claim 4, wherein approving the request includes determining that a second purse balance associated with the second purse satisfies the second threshold.

7. The computer-implemented method of claim 1, wherein approving the request includes, on condition that the first purse priority does not satisfy the first threshold and the difference satisfies the second threshold, approve the request for authorization.

8. The computer-implemented method of claim 1, wherein approving the request includes, on condition that the first purse priority does not satisfy the first threshold and the difference does not satisfy the second threshold, decline the request for authorization.

9. The computer-implemented method of claim 1, further comprising transferring funds to the first purse such that the first purse balance is increased.

10. The computer-implemented method of claim 1, further comprising periodically transferring a fixed amount of funds to the first purse such that the first purse balance is periodically increased by the fixed amount.

11. The computer-implemented method of claim 1, further comprising periodically transferring a variable amount of funds to the first purse such that the first purse balance is periodically increased by the variable amount.

12. The computer-implemented method of claim 1, wherein approving the request includes:
transmitting an instruction to prompt a cardholder associated with the cardholder account to approve a transfer of funds between the first purse and a second purse; and
receiving an approval of the transfer of funds.

13. The computer-implemented method of claim 1, further comprising:
receiving, from a client device, one or more parameters of the plurality of parameters; and
associating the one or more parameters with the first purse.

14. A computing device for managing funds for one or more financial transactions, the computing device comprising:
a memory storing data associated with one or more cardholder accounts, and computer-executable instructions, the one or more cardholder accounts associated with a plurality of electronic purses, the plurality of electronic purses being generated based at least on a spending history associated with a cardholder account of the one or more cardholder accounts, each of the plurality of purses being associated with a different purse category based at least on the spending history; and
a processor configured to execute the computer-executable instructions to:
receive a request for authorization of a first financial transaction of the one or more financial transactions, the first financial transaction associated with one or more factors including a transaction amount associated with the request;
identify a first purse associated with the cardholder account;
identify a purse priority and a purse balance associated with the first purse;
automatically determine a difference between the first purse balance and the transaction amount; and
based on condition that the purse priority satisfies a first threshold and the difference between the purse balance and the transaction amount satisfies a second threshold, approve the request for authorization.

15. The computing device of claim 14, wherein the processor is further configured to execute the computer-executable instructions to receive, from a financial transaction processing computing device, the request for authorization.

16. The computing device of claim 14, wherein the one or more factors include one or more of the following: a transaction time, a transaction date, and a transaction location.

17. The computing device of claim 14, wherein the processor is further configured to execute the computer-executable instructions to:
transmit an instruction to prompt a cardholder associated with the cardholder account to approve a transfer of funds between the first purse and a second purse; and
receive an approval of the transfer of funds.

18. A computer-readable storage device having computer-executable instructions embodied thereon, wherein, upon execution by at least one processor, the computer-executable instructions cause the processor to:
receive a request for authorization of a first financial transaction of one or more financial transactions, the first financial transaction associated with one or more factors including a transaction amount;
based on the one or more factors, identify a first purse of a plurality of purses associated with a cardholder account, the plurality of purses being generated based at least on a spending history associated with the cardholder account, each of the plurality of purses being associated with a different purse category based at least on the spending history, the first purse being associated with a purse priority and a purse balance;
automatically determine a difference between the purse balance and the transaction amount; and
based on condition that the purse priority satisfies a first threshold and the difference between the purse balance and the transaction amount satisfies a second threshold, approve the request for authorization.

19. The computer-readable storage device of claim 18, wherein the one or more factors include one or more of the following: a transaction time, a transaction date, and a transaction location.

20. The computer-readable storage device of claim 18, wherein, upon execution by the at least one processor, the computer-executable instructions further cause the processor to transfer funds between the first purse and a second purse based on whether the purse priority satisfies the first threshold and whether the difference satisfies the second threshold.

* * * * *